US011775777B2

(12) United States Patent
Fuerstenau et al.

(10) Patent No.: US 11,775,777 B2
(45) Date of Patent: Oct. 3, 2023

(54) ARTIFICIAL INTELLIGENCE SYSTEM USING PHRASE TABLES TO EVALUATE AND IMPROVE NEURAL NETWORK BASED MACHINE TRANSLATION

(71) Applicant: Amazon Technologies, Inc., Seattle, WA (US)

(72) Inventors: Hagen Fuerstenau, Berlin (DE); Felix Hieber, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/662,288

(22) Filed: May 6, 2022

(65) Prior Publication Data

US 2022/0261557 A1    Aug. 18, 2022

Related U.S. Application Data

(63) Continuation of application No. 16/994,347, filed on Aug. 14, 2020, now Pat. No. 11,328,129, which is a continuation of application No. 15/918,902, filed on Mar. 12, 2018, now Pat. No. 10,747,962.

(51) Int. Cl.
| | |
|---|---|
| G06F 40/44 | (2020.01) |
| G06N 3/08 | (2023.01) |
| G06N 20/00 | (2019.01) |
| G06F 40/51 | (2020.01) |
| G06F 40/55 | (2020.01) |
| G06F 40/58 | (2020.01) |

(52) U.S. Cl.
CPC ............. *G06F 40/44* (2020.01); *G06F 40/51* (2020.01); *G06F 40/55* (2020.01); *G06F 40/58* (2020.01); *G06N 3/08* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,454,326 B2 | 11/2008 | Marcu et al. | |
| 8,060,360 B2 | 11/2011 | He | |
| 9,508,347 B2 | 11/2016 | Wang et al. | |
| 9,563,854 B2 | 2/2017 | Cruz Mota et al. | |
| 10,257,275 B1 | 4/2019 | Dirac et al. | |
| 10,417,350 B1 | 9/2019 | Mohamed et al. | |
| 10,747,962 B1 * | 8/2020 | Fuerstenau | G06N 3/0445 |
| 11,063,916 B1 | 7/2021 | Ferreira et al. | |
| 11,108,575 B2 | 8/2021 | Kasaragod et al. | |
| 11,328,129 B2 * | 5/2022 | Fuerstenau | G06N 3/08 |

(Continued)

OTHER PUBLICATIONS

Turchi Marco, et al., "Learning Machine Translation from In-domain and Out-of-domain Data", Proceedings of the 16th EAMT Conference, 2012, pp. 305-312.

Philipp Koehn, "Moses Statistical Machine Translation System User Manual and Code Guide", 2010, pp. 1-359.

"Translator API—Microsoft Translator Text API", Retrieved from URL: https://www.microsoft.com/enus/translator/translatorapi.aspx on Sep. 12, 2016, pp. 1-2.

(Continued)

*Primary Examiner* — Antim G Shah
(74) *Attorney, Agent, or Firm* — Robert C. Kowert; Kowert, Hood, Munyon, Rankin & Goetzel, P.C.

(57) ABSTRACT

Based on a candidate set of translations produced by a neural network based machine learning model, a mapping data structure such as a statistical phrase table is generated. The mapping data structure is analyzed to obtain a quality metric of the neural network based model. One or more operations are initiated based on the quality metric.

20 Claims, 11 Drawing Sheets

(56) References Cited

U.S. PATENT DOCUMENTS

| | | | |
|---|---|---|---|
| 2004/0002848 A1 | 1/2004 | Zhou et al. | |
| 2004/0024581 A1 | 2/2004 | Koehn et al. | |
| 2006/0015320 A1 | 1/2006 | Och | |
| 2007/0122347 A1 | 5/2007 | Statnikov et al. | |
| 2008/0154577 A1 | 6/2008 | Kim et al. | |
| 2009/0175545 A1 | 7/2009 | Cancedda et al. | |
| 2009/0248422 A1 | 10/2009 | Li et al. | |
| 2009/0326912 A1* | 12/2009 | Uefing .................. | G06F 40/44 706/12 |
| 2011/0307245 A1 | 12/2011 | Hanneman et al. | |
| 2012/0010869 A1 | 1/2012 | McCarley et al. | |
| 2012/0101804 A1 | 4/2012 | Roth et al. | |
| 2013/0121590 A1 | 5/2013 | Yamanaka et al. | |
| 2014/0358519 A1 | 12/2014 | Mirkin et al. | |
| 2015/0026586 A1 | 1/2015 | Nylund et al. | |
| 2015/0281401 A1 | 10/2015 | Le et al. | |
| 2015/0286632 A1 | 10/2015 | Meunier | |
| 2015/0293910 A1 | 10/2015 | Mathur et al. | |
| 2016/0050264 A1 | 2/2016 | Breed et al. | |
| 2016/0124944 A1* | 5/2016 | Andreoli ................. | G06F 40/51 704/2 |
| 2016/0217387 A1 | 7/2016 | Okanohara et al. | |
| 2016/0239749 A1 | 8/2016 | Peredriy et al. | |
| 2016/0358095 A1 | 12/2016 | Dong et al. | |
| 2017/0169015 A1* | 6/2017 | Huang ................... | G06F 40/51 |
| 2019/0018843 A1* | 1/2019 | Och ........................ | G06F 40/58 |
| 2019/0037040 A1 | 1/2019 | Kasaragod et al. | |
| 2019/0108834 A1 | 4/2019 | Nelson et al. | |
| 2019/0115008 A1 | 4/2019 | Jiang et al. | |

OTHER PUBLICATIONS

"Translator Hub—Microsoft Translator Hub", Retrieved from URL: https://www.microsoft.com/enus/translator/hub.aspx on Sep. 12, 2016, pp. 1-3.

Ulrich Germann, "Sampling Phrase Tables for the Moses Statistical Machine Translation System" the Prague Bulletin of Mathematical Linguistics, Oct. 2015, pp. 39-50.

Philipp Koehn, "IBM Model 1 and the EM Algortihm", Machine Translation, dated Sep. 14, 2017, pp. 1-46.

Philipp Koehn et al, "Statistical Phrase-Based Translation", Presentations at DARPA IAO Machine Translation Work-Shop, Jul. 22-23, 2002, pp. 1-7.

Graham Neubig, "Neural Machine Translation and Sequence-to-Sequence Models: A Tutorial", Mar. 5, 2017, pp. 1-65.

Unknown, "An open source neural machine translation system", Dec. 11, 2017, pp. 1-3.

Marcin Junczys-Dowmunt, "Phrasal Rank-Encoding: Exploiting Phrase Redundancy and Translational Relations for Phrase Table Compression", Oct. 2012, pp. 63-74.

Ilya Sutskever et al, "Sequence to Sequence Learning with Neural Networks", Dec. 14, 2014, pp. 1-9.

Charles Schafer et al, "An Overview of Statistical Machine Translation", 2006, pp. 1-104.

KantanMT, "KantanMT Users can now customise and deploy neural machine translation engines", Dec. 11, 2017, pp. 1-2.

U.S. Appl. No. 15/279,333, filed Sep. 28, 2016, Alex Klementiev.

* cited by examiner

ARTIFICIAL INTELLIGENCE SYSTEM USING PHRASE TABLES TO EVALUATE AND IMPROVE NEURAL NETWORK BASED MACHINE TRANSLATION

This application is a continuation of U.S. patent application Ser. No. 16/994,347, filed Aug. 14, 2020, which is a continuation of U.S. patent and application Ser. No. 15/918,902, filed Mar. 12, 2018, now U.S. Pat. No. 10,747,962, which are hereby incorporated by reference herein in their entirety.

BACKGROUND

Many business organizations today have to manage assets, customers and employees distributed across several different countries or regions which are linguistically distinct from one another. As such, accurate and efficient translation of various types of text documents (and/or speech) between the languages used in the countries or regions may become important factors contributing to the success of the organizations. A large web-based retailer may, for example, sell products in dozens of countries, and the efficient translation of product descriptions, reviews and the like may be required to enhance international sales. Translations may also be required at high volumes for governmental and other non-business entities, such as multi-national political groups like the European Union or the United Nations, scientific/technical journals, and the like. Tourists and other international travelers may also require quick and accurate translations. Automating text/voice translation, if translations of a sufficiently high quality can be obtained using automation, may often represent the most cost-effective approach.

A number of different approaches may be taken towards automated translation, including rule-based techniques, example-based techniques, statistical machine translation (SMT), and more recently, neural network based machine translation (NMT). In SMT, translations are usually generated using statistical models whose parameters are derived from existing translated data sets. A given model may comprise, for example, mappings between words or phrases of a source language and words or phrases of the target language (the language into which source language text is to be translated), together with various parameters and/or other metadata regarding the mappings. After such a model has been trained, it is utilized by a decoding algorithm to perform translations in production environments. In NMT, words, phrases or sentences in a source language are typically mapped to high-dimensional vectors within a model using layers of interconnected artificial neurons, and then corresponding words, phrases or sentences in a target language are generated from those vectors.

Although NMT has been shown to be superior to other approaches in terms of translation quality in various scenarios, as with all automated translation techniques it has its flaws. One of the potential problems with NMT is that it is more opaque than alternative approaches—that is, it may not be very clear how exactly translations are generated, and it may therefore be harder to correct translation errors. Evaluating and analyzing the capabilities of a trained NMT system at a suitably granular level to enable appropriate proactive responses to be taken with respect to potential translation problems remains a non-trivial technical challenge.

Figure 1:
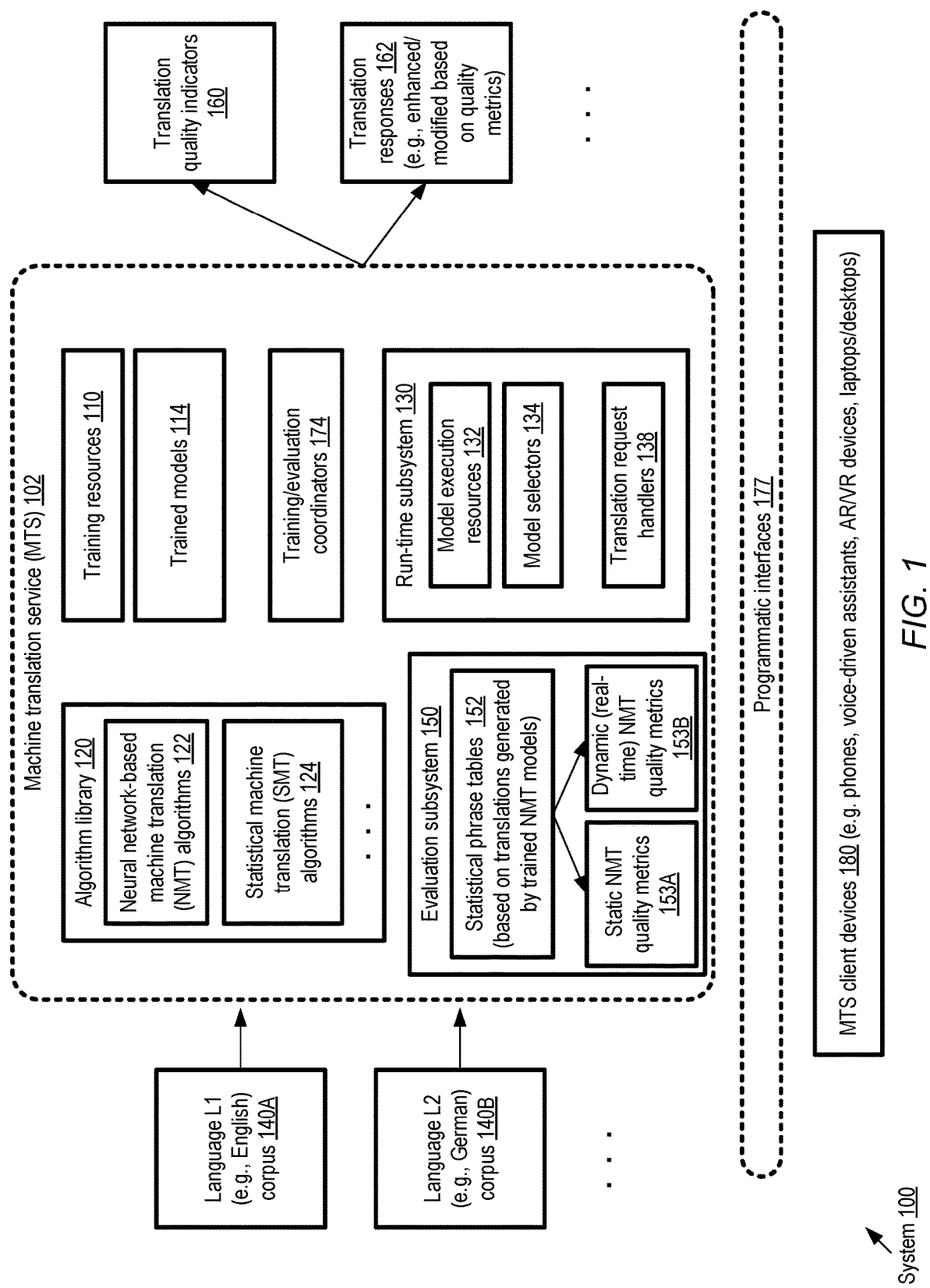
FIG. 1 illustrates an example system environment in which techniques for evaluating neural network based machine translation models using statistical phrase tables may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for evaluating and improving neural network based machine translation systems using statistical phrase tables and/or other mapping data structures are described. As one skilled in the art will appreciate in light of this disclosure, certain embodiments may be capable of achieving various advantages, including some or all of the following: (a) enhancing the user experience of a client of a translation service or tool which uses neural network based machine translation, e.g., by providing simplified representations such as confidence scores (at the phrase level) of aspects of the complex internal logic used in the models, (b) reducing the overall resources (including computational resources, memory and the like) required for training high-quality translation models, by pointing out potential areas of model weakness at an early stage of the model development/deployment process, which can then be addressed without wasting resources on areas in which the models are already strong, and (c) providing, using an ensemble of techniques, more accurate translations for some input sentences than would be otherwise obtained from a single neural network based machine translation model, even in scenarios in which the neural network based machine translation model may have a higher average quality of translation results than the other techniques included in the ensemble. The advantages may also include achieving a reduction in memory, storage and/or computational resources used for translations in some embodiments in which the ensemble-based approach is employed. Assume that an ensemble of techniques is available for translation, and that, for some translation requests, the evaluation techniques described herein indicate that an adequate or superior translation can be obtained from an alternate technique (e.g., a simple dictionary-based translation technique) that does not use the neural network. To perform the evaluation and utilize the alternate technique based on results of the evaluation, a smaller overall amount of memory, storage and/or computational cycles may be required than if the neural network model had to be trained to achieve the desired quality of translations (and, of course, executed after it was trained). The translation may also potentially be obtained more quickly in some cases by using the alternate technique rather than the neural network model.

In various embodiments, such evaluation and enhancement techniques may be implemented at a network-accessible machine translation service. Such a service may, for example, comprise a plurality of resources for generating models used for automatic translations of token sequences in one or more source (or input) languages, into corresponding token sequences of one or more target (or output) languages. Depending on the language, a token of a token sequence may for example comprise a word, a character, a symbol or pictograph, a punctuation indicator and the like in various embodiments. According to some embodiments, a neural network based machine translation (NMT) model may be trained, using a given pair of language data sets or corpora (one corpus in a source language, and a second corpus representing a trusted translation of the source language corpus into a target language), to translate arbitrary token sequences of the source language into the target language. Any of a variety of neural network architectures may be employed for the model, including for example sequence-to-sequence architectures in which long short term memory units (LSTMs) are used. After the NMT model has been trained, a candidate set of translations in the target language (corresponding to another corpus of token sequences of the source language) may be obtained from the trained version of the NMT model, and used to help evaluate the quality of the trained NMT model. In various embodiments, based at least in part on analysis of the candidate set and the corresponding source language corpus, a statistical phrase table (or a conceptually analogous mapping data structure) may be generated. A statistical phrase table, as implied by the name, may comprise a plurality of entries corresponding to respective phrases or token sub-sequences of the source language (as represented in the source corpus used for the translation), where a given entry may include an example of a translated phrase corresponding to a source phrase, and one or more properties of the translation (such as a numeric score indicative of a probability or confidence associated with the correctness of the translation). One simple example of a phrase table entry for a German-to-English translation using NMT may indicate that the confidence score or probability (assuming a feasible score range between 0 and 1) associated with translating the phrase "gute Besserung" to "get well soon" is 0.7. A given phrase in a source language may have multiple entries in a statistical phrase table—e.g., another entry, translating "gute Besserung" to "get well" may be assigned a score of 0.2.

In various embodiments, the entries of a statistical phrase table (SPT) may comprise a contiguous group of tokens as the input token collection, and a contiguous group of tokens in the target language as the output token collection to which the input is mapped. It is noted that although, in much of the following description, phrase tables are used as the primary examples of the data structures derived from an analysis of NMT translations and used for evaluating the quality of the NMT model, other types of mapping data structures may be used for similar purposes in at least some embodiments. For example, a mapping data structure that permits gaps or placeholders between tokens in an entry (in the input token collection of an entry and/or in the translated token collection) may be used in some embodiments. In addition to entries which show that a contiguous collection of source language tokens is translated to a contiguous collection of target language tokens with some probability by the NMT (as in SPTs), such a data structure may include entries in which, with some probability, (a) a collection of contiguous source language tokens is translated into a collection of non-contiguous target language tokens, (b) a collection of non-contiguous source language tokens is translated into a collection of contiguous target language tokens and/or (c) a collection of non-contiguous source language tokens is translated into a collection of non-contiguous target language tokens. As such, an SPT may represent just one example of a broader class of mapping data structures that may be employed in various embodiments.

Based at least in part on an analysis of the statistical phrase table generated from the translation candidate token sequences produced by the NMT model, one or more quality metrics for the NMT model may be obtained in various embodiments. A number of different kinds of quality metrics may be obtained in some embodiments using a variety of techniques—e.g., global or model-level quality metrics may be estimated in some embodiments, while metrics specific to input token sequences of the source language may be estimated in other embodiments. The metrics may be utilized in numerous ways in different embodiments—e.g., to help understand, debug or tune the NMT model, to motivate retraining of the NMT model, to guide post-training modification of NMT model parameters, to select alternative models from an ensemble to generate responses for some translation requests, and so on. As such, in various embodiments, one or more operations may be initiated based on an examination of the quality metrics generated using the statistical phrase tables.

The statistical phrase table entries may be generated by analyzing the occurrences of various token sequences in the source language corpus and the candidate translated corpus generated by the trained NMT model in various embodiments, in a manner analogous to the way statistical phrase tables are typically generated in statistical machine translation (SMT) algorithms which do not use neural networks. Steps involved in generating the statistical phrase tables may include, for example, word alignment, phrase extraction and scoring. One significant difference between the use of phrase tables for SMT and for evaluating the NMT mode is that in the SMT case, the target language corpus which is used (together with a corresponding source language corpus) to generate a phrase table is typically the product of skilled human translators, and not the automatically-generated output of a neural network based model. Furthermore, the phrase table in the SMT scenario is typically used to actually help generate translations, and not to evaluate or improve a neural network based model. Note that mapping data structures mentioned earlier, which may include entries with non-contiguous token collections, may also be generated analogously when hierarchical or grammar-based SMT techniques are employed.

As mentioned above, quality metrics for the NMT model may be obtained using any combination of several different approaches. For example, the fraction of entries in the statistical phrase table whose score exceeds a threshold may be computed and used as one of the quality indicators in some embodiments. A higher average confidence score may, at least in some embodiments, indicate a higher overall quality of translations. In at least one embodiment, the statistical distributions of scores associated with various table entries may be examined, and a quality metric corresponding to the distribution may be generated. For example, in one embodiment a preferred distribution may represent a high probability that a given source phrase is translated to a given target phrase, with relatively low probabilities associated with other alternative translations; in such an embodiment, the fraction of source phrases with such preferred distribution "shapes" may be used as a quality metric.

In at least some embodiments, another machine learning model, referred to as a quality estimation model, may be used to obtain NMT quality metrics. The inputs to a trained version of such a model may include, for example, specific phase pairs <source language phrase, NMT-model-translated target language phrase> as well as representations of at least a portion of the statistical phrase table, and the output may comprise one or more quality scores for the translation represented by the input phrase pair. In one embodiment, two statistical phrase tables may be compared with one another to obtain a quality metric for an NMT model—e.g., the phrase table generated using the output from the NMT model may be compared with a phrase table generated for a similar language domain or topic using output from human translators or other trusted translation systems.

According to one embodiment, a client of a machine translation service may submit a request via a programmatic interface (e.g., a web-based console, an application programming interface, a command-line tool or a graphical user interface) to train and/or evaluate a neural network based machine translation model, and the phrase table may be generated at least in part in response to such a request. In some embodiments, clients of a machine translation service may submit a trained NMT model via a programmatic interface, e.g., requesting that the trained model be evaluated; in response, quality metrics generated using the phrase table-based techniques escribed above may be provided by the service.

In some embodiments, a machine translation service or analogous tool may be responsible for generating translations in real time, and the evaluation technique introduced above may be employed when responding to translation requests. For example, if a particular implicit or explicit translation request indicates that a phrase P1 in source language SL1 is to be translated into a target language TL1, the service or tool may be able to determine, based on earlier-generated quality metrics and a quick examination of P1, that a particular NMT model M1 should not be used for the requested translation (e.g., because the expected quality of the translation is low). In such a scenario, in one embodiment, an alternate machine translation mechanism or subsystem may be employed for at least a portion of the requested translation—e.g., an SMT algorithm may be used, a dictionary-based translation (in which source-language-token-to-target-language-token mappings are used instead of translating token sequences collectively) may be used. In some embodiments, if a decision is made, using the available quality metrics, that an NMT model is not to be used, an error message (e.g., the logical equivalent of the message "Translation unavailable") may be provided in response to a translation request, or one or more of the input tokens may simply be replicated in the "translated" output. It is noted that in at least some scenarios, it may be preferable to indicate that a translation is not available, instead of providing a potentially low-quality or erroneous translation.

Translation requests which are satisfied using trained NMT models may be submitted via a variety of client device types and interface types in different embodiments. For example, a translation request whose response is generated at least partly based on NMT model quality metrics derived from phrase table analysis may be received from, among others, a voice-drive personal assistant device, a wearable computing device, a phone, a tablet computing device, a desktop computing device, a laptop computing device, a camera, an augmented reality device or a virtual reality device in various embodiments. In some embodiments, the response to a translation request may be based at least in part on the type of source device from which the request is received—e.g., a determination may be made that a translation request received from a camera may not have to be of as high a quality as a translation request received from a desktop, so a particular NMT model may be used for a particular camera-submitted request while being rejected if the same source language phrase was submitted from a desktop.

As mentioned earlier, the NMT model quality metrics generated using phrase tables may be used to perform a variety of operations in different embodiments. Such operations may include, among others, modifying a parameter (e.g., a weight or bias value) of the neural network, re-training at least a portion of the NMT model, providing a domain coverage indicator pertaining to the NMT model, routing a translation request to a manual translation service, and/or highlighting (e.g., based on confidence levels indicated by one or more quality metrics) a portion of translated output presented via a visual interface.

Example System Environment

FIG. 1 illustrates an example system environment in which techniques for evaluating neural network based machine translation models using statistical phrase tables may be implemented, according to at least some embodiments. As shown, system 100 may comprise various resources and artifacts of a network-accessible machine translation service (MTS) 102. The machine translation service may comprise a set of training resources 110 which may be utilized to train machine learning models to be used for translating text or voice input from one or more source languages to one or more target languages. A set of training and evaluation coordinators 174 may be responsible for training, using resources 110, models implementing various automated translation algorithms of library 120, including at least some neural network based machine translation (NMT) algorithms 122. In some embodiments, neural network based machine learning models similar to those used for translation may also be used for other applications, such as for determining responses to dialog sequences of a voice-driven application (some of which may not require translation per se) and the like. Any of a number of neural network architectures or designs may be employed in different embodiments, including for example sequence-to-sequence neural networks comprising long short-term memory units (LSTMs) and/or other types of recurrent or non-recurrent neural networks. The inputs used to train the models may comprise corpora 140 (data sets comprising examples of language token sequences) in a plurality of languages in the depicted embodiment, such as corpus 140A comprising token sequences in language L1 (e.g., English) and corpus 140B comprising corresponding translated token sequences in a different language L2 (e.g., German). In some embodiments, respective corpora for various languages may be obtained for different subject matter domains—e.g., one corpus pair may comprise English and German sentences associated with medical matters, another corpus pair may comprise English and German sentences associated with financial matters, and so on. In at least some embodiments, the algorithm library 120 may include one or more algorithms that do not utilize neural networks—e.g., statistical machine translation (SMT) algorithms 124 may be used for some types of translation requests or domains, or an ensemble of SMT and NMT models may be used for some translation requests.

In the embodiment shown in FIG. 1, as indicated above, one or more NMT models may be trained using input corpora 140 to translate token sequences (e.g., sequences of words, symbols such as punctuation, and so on) in a source language into token sequences of a target language. After an NMT model has been trained, candidate translations corresponding to at least one additional corpus (i.e., a corpus that was not used for the training) in the source language may be obtained using the trained version of the NMT model 114, and used to help evaluate (and in some cases improve) the trained model in the depicted embodiment. In at least some embodiments, one or more statistical phrase table(s) 152 may be generated from the candidate translations produced by the trained NMT model. Using the phrase tables, quality metrics such as 153A or 153B may be obtained for the trained NMT model. Static metrics 153A may, for example, be computed in advance of the use of the trained model for translating client-supplied token sequences; in contrast, dynamic metrics 153B may, for example, be specific to a given source language token sequence for which a translation is desired, and may in some cases be computed in real time. The statistical phrase table(s) 152 and at least some subset of the quality metrics 153 may be stored as artifacts of an evaluation subsystem 150 of MTS 102 in the depicted embodiment. In one embodiment, training/evaluation coordinators 174, implemented using one or more computing devices, may be responsible for generating the phrase tables 152 and the metrics 153. In other embodiments, separate coordinators may be used for evaluating the models and/or algorithms. The metrics 153 may be utilized in various ways to enhance the overall quality of the translations provided by the MTS 102 in the depicted embodiment—e.g., the metrics may help translation scientists understand the internal working of the NMT models, provide debugging information that can be used to adjust model parameters or retrain models, and so on. In some embodiments, the metrics may be used at run-time, e.g., to help generate at least part of a response to a translation request in real time as discussed below.

In the depicted embodiment, the machine translation service 102 may implement one or more programmatic interfaces 177, such as web-based consoles, application programming interfaces (APIs), command-line tools, graphical user interfaces, phone-based or tablet-based apps, and the like. Such programmatic interfaces 177 may be utilized by clients of the MTS to submit requests and receive corresponding responses using various types of client devices 180, such as phones, voice-driven assistant devices, augmented or virtual reality devices, laptops/desktops/tablets and the like. Clients may, for example, submit requests to train and/or evaluate machine translation models, or requests to translate a given token sequence from one language to another in various embodiments. Requests for training and/or evaluating MT models may be processed by the training/evaluation coordinators 174 in the depicted embodiment, while translation requests may be processed at a run-time subsystem 130.

The run-time subsystem 130 of the MTS may comprise, for example one or more translation request handlers 138, model execution resources 132, and/or model selectors 134 in some embodiments. In one embodiment, when a request to translate a given source language token sequence is received at the MTS, a translation request handler may determine whether the quality of the translation that can be expected from a given trained NMT model (if such a model exists for the type of input to be translated) is acceptable or not. Stored versions of model quality metrics 153 may be employed to make such a decision in at least some embodiments, while in other embodiments model quality metrics specific to the request may be generated dynamically at run-time with the help of the statistical phrase tables 152 and used for such decisions. If the quality is deemed acceptable, the trained NMT model 114 may be executed at resources 132 with the source language token sequence as input, and the output of the trained NMT model may be included in the translation response 162 in the depicted embodiment. In at least some embodiments, in addition to the translated output token sequence, one or more translation quality indicators 160 may also be provided. For example, in a scenario in which the output is being provided via a text or other visual interface (instead of, for example, being voiced or uttered) a portion of the translation may be highlighted to indicate a high degree of confidence, different portions of the translation may be highlighted using different colors or fonts to represent the respective translation confidence levels, or an overall score indicating the expected quality of the translation may be displayed.

In at least some embodiments, if the anticipated quality of the translation (as indicated by the quality metrics) that is likely to be provided by the current version of a trained NMT model is insufficient for a given translation request, alternative techniques may be employed to produce the corresponding translation response 162. For example, if an ensemble comprising multiple machine translation models or methodologies is available for the type of token sequences to be translated, one or more methodologies that do not require the use of the trained NMT model may be implemented. In one embodiment, a statistical machine translation (SMT) model may be executed, or a different NMT model may be tried. In some embodiments, at least a portion of the input token sequence that is anticipated to be hard to translate using the trained NMT model may be re-routed to human translators, or simply included in untranslated form in the translation response.

A number of different algorithms may be implemented to compute or estimate the model quality metrics 153 using the statistical phrase tables in different embodiments. In one embodiment, the scores indicated in the phrase table entries for respective (source language token sequence, target language token sequence) pairs may be examined, and the fraction of entries whose scores meet a threshold criterion (e.g., "score greater than 0.6 on a scale from 0.0 to 1.0") may be determined and used as a quality metric. In another embodiment, the distributions of the probabilities/scores for the different translation options corresponding to source language token sequences may be analyzed, and a quality metric may be derived from the properties (such as variance, standard deviations and the like) of the distributions. In some embodiments, another machine learning model may be trained as a quality estimation model for the NMT model— e.g., with input of the quality estimation model comprising token sequence pairs in the source and target languages, as well as a representation of at least some portions of the phrase table. In one embodiment, a statistical phrase table 152 generated using translations produced by the NMT may be compared to another statistical phrase table generated using human-provided translations, and a result of the comparison may be used as a quality metric. In at least one embodiment, a dynamic NMT quality metric 153B may be obtained by generating a set of phrases from the submitted input tokens of a translation request, and computing the fraction of those phrases for which the statistical phrase table comprises high-confidence translations (or any translations).

Example Sequence-To-Sequence Neural Network Architecture

Figure 2:
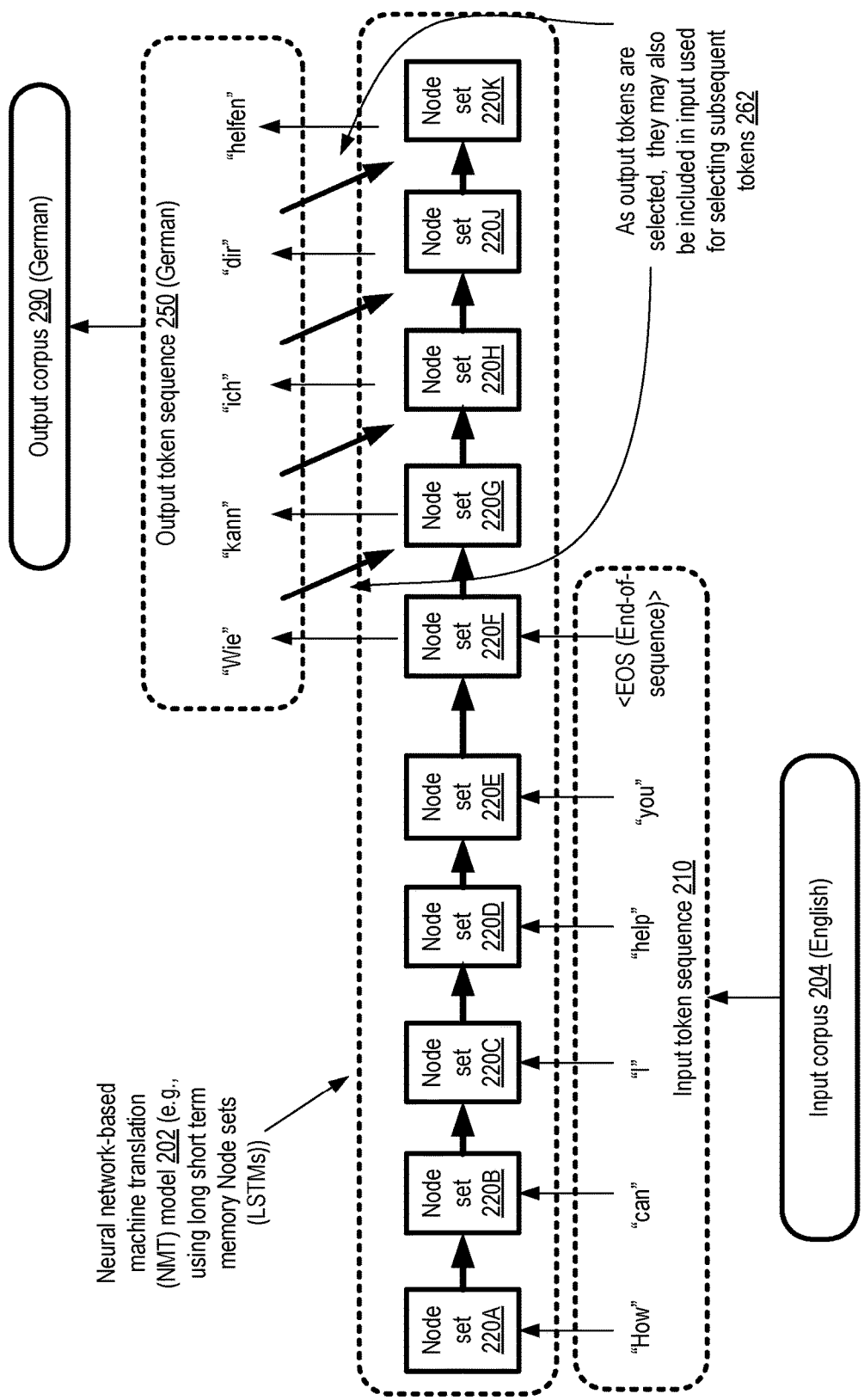
FIG. 2 illustrates an example sequence-to-sequence neural network architecture which may be employed for machine translation, according to at least some embodiments.

FIG. 2 illustrates an example sequence-to-sequence neural network architecture which may be employed for machine translation, according to at least some embodiments. In the depicted embodiment, a neural network based machine translation model 202 comprises artificial neurons or nodes arranged in units or sets 220 (e.g., node sets 220A-220K), where each set may comprise a similar group of connections among its member nodes. In some embodiments, long short-term memory (LSTM) units may be used. In the depicted embodiment, the model may be trained to read token sequences 210 (such as the token sequence "How can I help you") from an input corpus 204 in a source language (e.g., English), and generate corresponding output token sequences 250 in a target language (e.g., German). The input tokens may be consumed one token or time-step at a time, and the parameters (e.g., weights, biases etc.) of various nodes of the network may be modified to generate internal representations of the input token sequences in the depicted embodiment.

The internal representations may then be converted into output token sequences 250 (e.g., "Wie kann ich dir helfen") which collectively form a translated corpus 290 in a target language (e.g., German). As such, a model with a structure similar to 202 may be referred to as a sequence-to-sequence model in various embodiments. The model 202 may learn from the sequencing of the input tokens relative to one another, and use that learning to position tokens of the output relative to one another. As indicated by label 202, as individual output tokens are selected, they may also be included in the input provided to units of the neural network that are to select the following tokens of the output in the depicted embodiment. This latter approach may represent one example of a recurrent neural network architecture.

It is noted that in some embodiments, neural network models with architectures that differ from that illustrated in FIG. 2 may be used. For example, multiple layers of recurrent neural networks may be stacked on top of each other in some embodiments, with links between corresponding units of the different layers. In other embodiments, stacks of recurrent neural network layers may include residual links—e.g., the output of a previous layer may be added to the result of a given layer. Convolutional neural networks and/or tree-structured neural networks may be utilized in some embodiments. Ensembles of several different types of neural network based machine translation models may be employed in some embodiments, with the final results of the ensemble being derived from the results of the individual models of the ensemble.

NMT Quality Metrics Determination Workflow Overview

Figure 3:
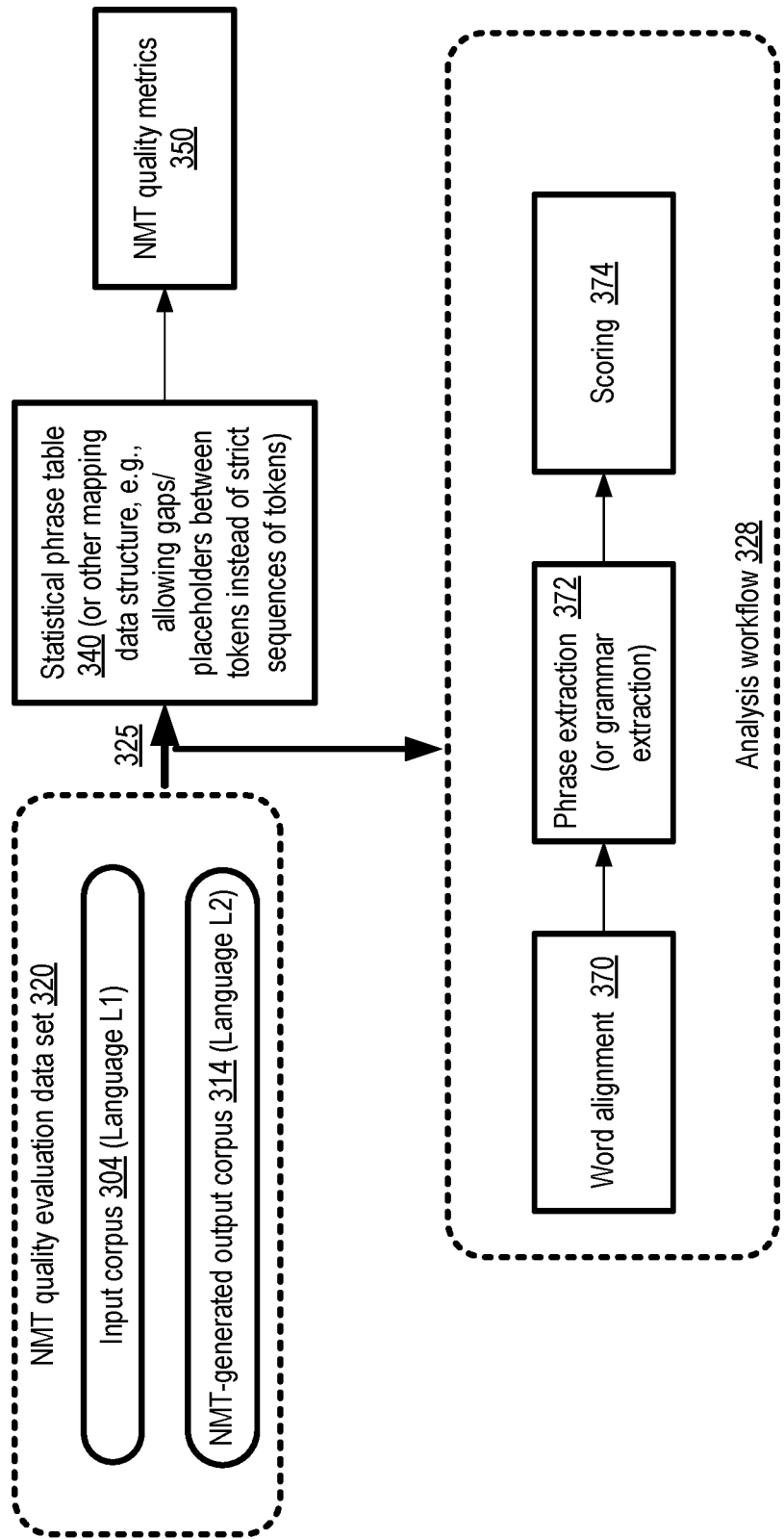
FIG. 3 provides a high-level overview of a workflow for obtaining quality metrics for neural network based machine translation models using statistical phrase tables or other mapping data structures, according to at least some embodiments.

FIG. 3 provides a high-level overview of a workflow for obtaining quality metrics for neural network based machine translation models using statistical phrase tables or other mapping data structures, according to at least some embodiments. After a neural network based machine translation model has been trained, an output corpus 314 in a target language (e.g., L2) may be obtained from the trained NMT model, corresponding to an input corpus 304 in a source language (e.g., L1). The data set 320 to be used for quality evaluation may comprise both corpus 304 and corpus 314 in the depicted embodiment.

Based on an analysis of the data set 320, one or more statistical phrase tables 340 or other mapping data structures may be generated in various embodiments, as indicated by arrow 325. As mentioned earlier, such other mapping data structures may include entries with gaps or placeholders between tokens. The workflow 328 of the analysis 325 may comprise several phases, including word alignment 370, phrase extraction 372 (or, in the cases where other mapping data structures are used, grammar extraction) and scoring 374 in the depicted embodiment. Using the statistical phrase table 340 or mapping data structure, one or more NMT quality metrics 350 may be generated in various embodiments as discussed below in further detail.

In the word alignment phase 370, in some embodiments the logical equivalent of a bipartite graph may be generated between the words or tokens of a source language sentence S1 and the words or tokens of a sentence S2 in a target language which is assumed to represent the translation of the source language sentence. The graph may, for example, comprise an arc between two words if they represent translations of one another. In some embodiments, a family of models referred to as "IBM models" which use an expectation-maximization algorithm may be employed for word alignment. Sequences of one or more words/tokens in the source language and the corresponding sequences of one or more words/tokens in the target language may be extracted in the phrase extraction phase 372 in various embodiments. Note that the term "phrase" as used in the context of analysis 325 may not necessarily refer to strict linguistic groupings such as noun phrases, verb phrases, prepositional phrases and the like—instead, sequences of tokens which do not necessarily match linguistic part-of-speech definitions (such as the German token sequence "spass am" corresponding to the English token sequence "fun with the") may be extracted in various embodiments. In the scoring phase, for a given pair of <source language token sequence STS, target language token sequence TTS>, one or more numerical scores or features may be generated. One of the scores may comprise a forward probability, indicative of a probability that TTS is the correct (or the most correct, among the options identified) translation of STS in various embodiments. In some embodiments, a reverse probability score may also be generated and stored, indicating the probability that STS is the most correct translation of TTS. In at least one embodiment, other numerical features indicative of, for example, the probability that the ordinal position of STS within a sentence is likely to be the same as the ordinal position of TTS, may be generated and stored, and so on.

Example Statistical Phrase Table Entries

Figure 4:
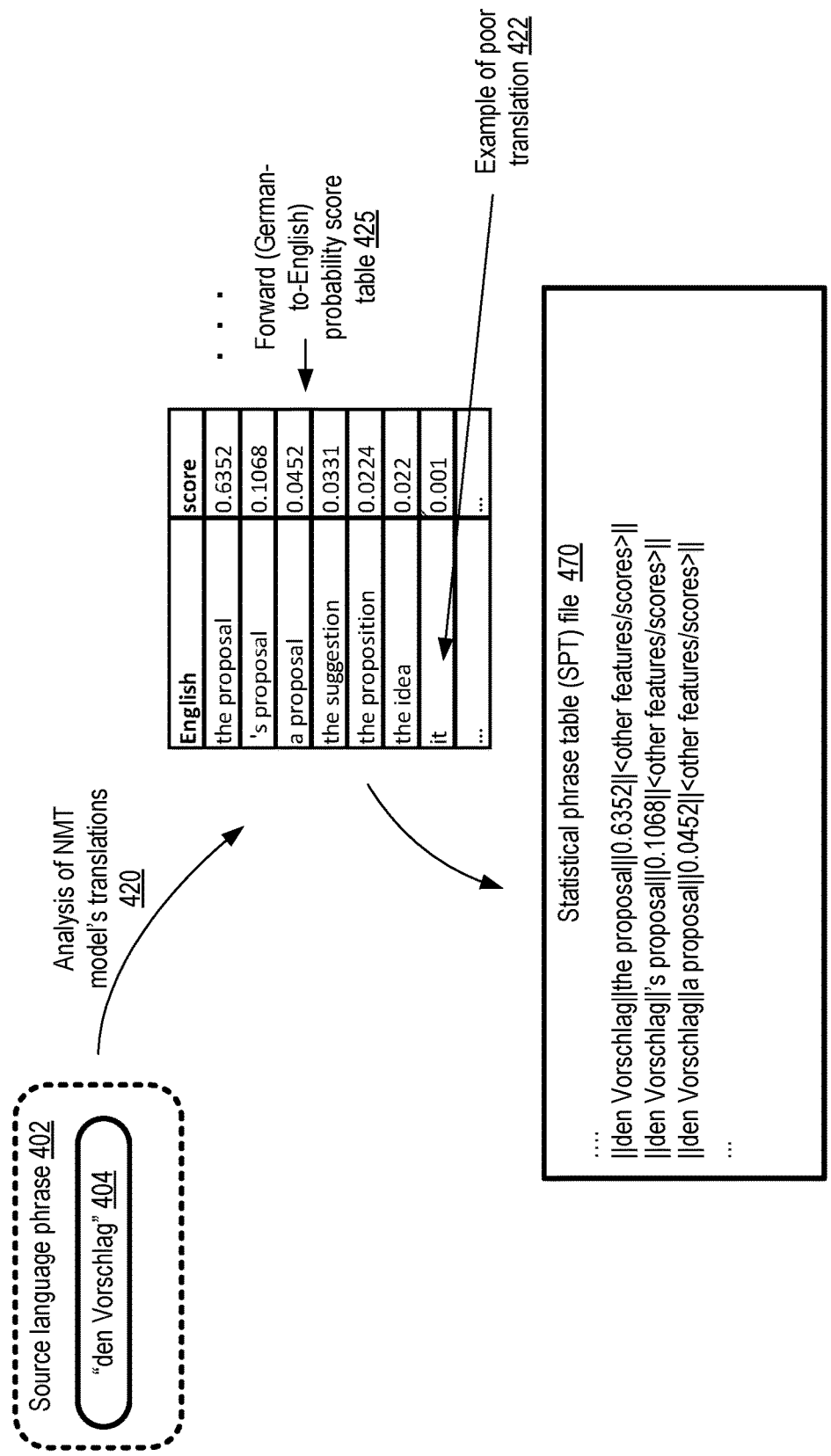
FIG. 4 illustrates an example of a portion of a statistical phrase translation table, according to at least some embodiments.

FIG. 4 illustrates an example of a portion of a statistical phrase translation table, according to at least some embodiments. In the depicted example scenario, the source language is German, and the target language is English. Corresponding to a given source language phrase 402 (such as "den Vorschlag" 404), analysis 420 of the NMT model's German-to-English translations over a given corpus may yield a plurality of translation options, such as "the proposal", "a proposal", etc.

Depending on the number of occurrences of the different translation options, and/or on other factors, a forward probability score table 425 may be generated in the depicted embodiment. As shown, a forward probability score of 0.6352 (or 63.52%) may be assigned to the translation "the proposal", a forward probability score of 0.1068 (10.68%) may be assigned to "'s proposal", and so on. The scores may represent statistical information as obtained from the NMT model's translations, and may not necessarily indicate linguistic correctness of the translation candidates in various embodiments. Some entries of the forward probability score table may include translations that are very likely to be incorrect (such as the entry 422 suggesting that "den Vorschlag" can be translated to the word "it") in at least some embodiments.

Similar tables may be constructed for other features, such as for backwards (English-to-German) translation, in some embodiments. From the contents of the probability score tables, a statistical phrase table file 470 may be generated, comprising one or more entries for various token sequences or phrases of the source language. In the depicted embodiment, each entry may be represented by a line of text in the file, with elements of the line separated by a delimiter such as "||". As shown, a given entry may include a source language token sequence, a translated target language sequence token, and one or more scores such as a forward probability score in the depicted embodiment. In some embodiments in which several different scores are generated for some entries of the SPT 470, not all the entries may include all the different scores. In at least some embodiments, a statistical phrase table may be structured differently than shown in FIG. 4, and/or may not necessarily be stored in a file.

Example Analyses Methodologies to Obtain Quality Metrics

Figure 5:
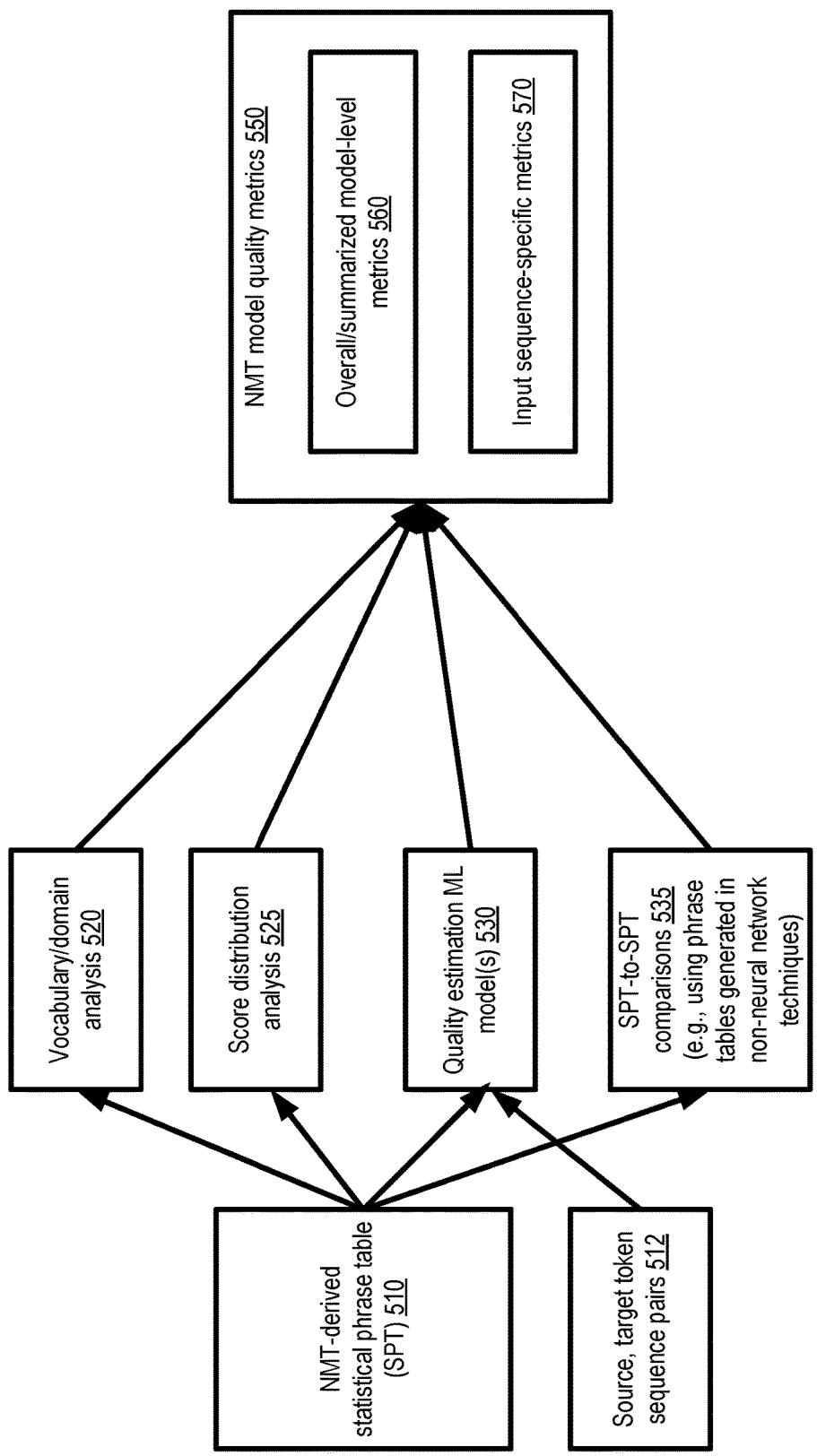
FIG. 5 illustrates example analysis techniques which may be utilized to generate one or more types of quality metrics for neural network based machine translation models, according to at least some embodiments.

FIG. 5 illustrates example analysis techniques which may be utilized to generate one or more types of quality metrics for neural network based machine translation models, according to at least some embodiments. Using the NMT-derived statistical phrase table (SPT) 510, vocabulary or domain analysis 520 may be performed in some embodiments. Such analysis may, for example, comprise computing the fraction of words/phrases in the source language corpus for which corresponding translations exist (with a translation probability score which exceeds a selected threshold) in the translated corpus. In some embodiments, the source language corpus used to generate the candidate translations from which the phrase table is constructed may be general, i.e., not restricted to a specific subject matter domain. A respective set of commonly-used words or phrases of several different subject matter domains may be obtained, e.g., from some other data source, and the statistical phrase table may be examined in the context of the sets of commonly-used words/phrases to determine the extent to which a given subject matter is covered by the trained NMT.

As indicated earlier, a number of different translated token sequences for a given source token sequence may be represented in the SPT in various embodiments, with respective scores of one or more categories associated with the various options. The distributions of the scores of a particular type (e.g., forward translation probability scores) may be analyzed in some embodiments for various source language token sequences, as indicated in element 525. The characteristics of the distributions, such as how narrow the peaks of the distributions are, may be used to generate model quality indicators in some embodiments. For example, in one embodiment, the model's translation capability with respect to a phrase may be considered better if there are at most one or two translations with high forward probabilities, than if there are more than five translations with roughly similar forward translation probabilities. Numerical representations of the distributions (e.g., based on standard deviation or other variation-related properties of the distributions) may be used as quality metrics in some embodiments.

In at least some embodiments, an additional machine learning model (different from the NMT model itself) called a quality estimation model 530 may be used. Such a model, which may for example also comprise a neural network model in some embodiments, may be used as follows. Individual ones of the training examples of the quality estimation (QE) model may comprise (a) an input token collection in a source language (b) a translation of the input in a target language, generated using the trained NMT, and (c) a translation quality score (e.g., between 0 and 1), e.g., generated by a human fluent in both languages. The QE model may access at least a portion of the SPT to generate some features used internally in various embodiments; other features may be generated without consulting the SPT, e.g., based on the relative lengths of the source and target token collections, based on the frequency or rarity of phrases in the input examples, and so on. The features derived from the SPT may be based, for example, on the entropy of the phrases for which entries are present in the SPT, the shapes of the distributions of the translation probabilities, etc. The SPT may thus be considered an input source of information for the QE model, which does not change with the input examples of the QE. After the QE has been trained, it may produce its own translation quality scores for translations produced by the NMT in various embodiments. Machine learning algorithms which analyze the SPT but do not use neural networks may be used for quality estimation in some embodiments.

In some embodiments, in addition to the SPT 510 generated using the NMT model's candidate translations of a particular source language corpus, additional SPTs for translations between the source language and the target language may be available. For example, a statistical machine translation model may also have been generated for the source and target languages, using some other <source, target> corpus pair. In one embodiment, the SPT 520 generated based on the NMT model's translation effort may be compared with another SPT, and results of such SPT-to-SPT comparisons 535 may be used as translation model quality metrics of the NMT.

NMT model quality metrics 550 may be generated at any of several different granularities in various embodiments. Some of the metrics 560 may be indicative of broad model-level quality, while other metrics 570 may be specific to individual input sequences or groups of related input sequences. For example, in one embodiment, based on score distribution analysis 525 and/or output from a quality estimation model 530, an overall quality metric 560 for the NMT model as a whole may be obtained. In contrast, in some embodiments, when a token sequence to be translated is received, the expected quality of the NMT's translations of that token sequence may be obtained, e.g., based on coverage measurements, SPT-to-SPT comparisons, distribution analysis or the like. Metrics of both granularities may be generated and used (e.g., by reporting the metrics along with translations generated using the NMT model) in at least some embodiments.

Example Responsive Actions Based on NMT Quality Metrics

Figure 6:
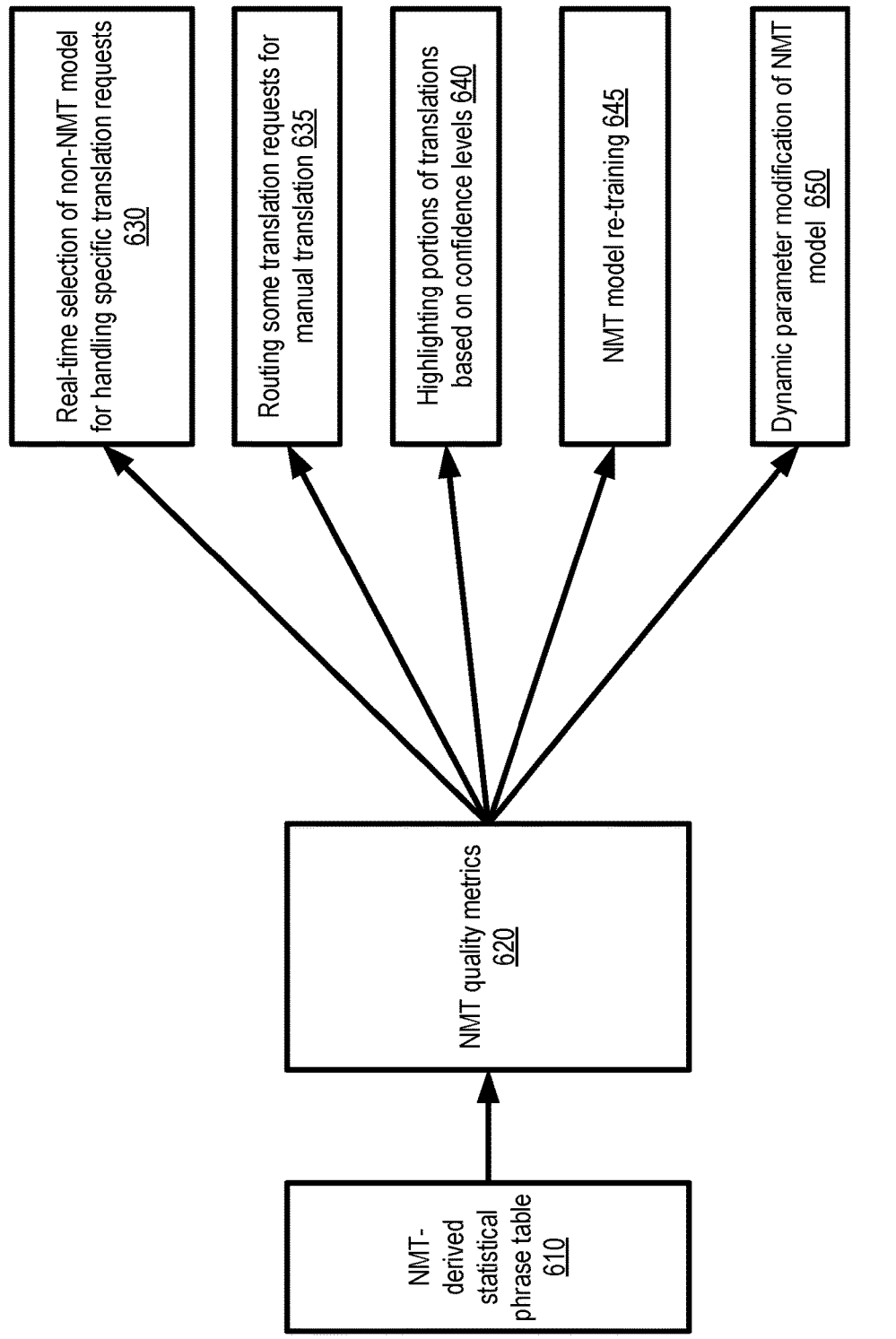
FIG. 6 illustrates examples of the kinds of actions that may be taken based on quality metrics generated for neural network based machine translation models, according to at least some embodiments.

FIG. 6 illustrates examples of the kinds of actions that may be taken based on quality metrics generated for neural network based machine translation models, according to at least some embodiments. As shown, one or more NMT quality metrics 620 may be obtained in the depicted embodiment, e.g., based at least in part on an examination of an NMT-derived statistical phrase table 610 as discussed above.

In some embodiments, the quality metrics may be used to generate at least a portion of a response to a real-time translation request. For example, in an embodiment in which an ensemble comprising several different machine translation models (such as a statistical machine translation model in addition to an NMT model) is available, a quality metric that indicates that a particular source language token sequence is not going to be translated well or successfully by the NMT may trigger the real-time selection 630 of a different model for the particular source language token sequence.

In at least one embodiment, a model that is capable of providing a translation of a desired quality or accuracy may not be available for some translation requests. In such a scenario, metrics indicating that the NMT model would be insufficient may be use to automatically route the translation request for manual translation (element 635). In one embodiment, based on the NMT model quality metrics, a decision may be taken to avoid translating a particular phrase or word—e.g., the source language phrase or word may simply be reproduced without translation in the output, thereby avoiding the possibility of an erroneous translation.

According to some embodiments, one or more NMT quality metrics may be utilized to highlight portions of translations generated using the NMT model, as discussed below in further detail with respect to FIG. 7. For example, phrase pairs for which there is a high degree of confidence in the translation provided may be shown in one color or font, while phrase pairs for which there is a lower level of confidence may be shown in a different color or font.

An analysis of the model quality metrics 620 may trigger re-training 645 of the NMT model in some embodiments. For example, the model may have initially been trained using a particular pair of corpora as the training data set, until a desired level of translation accuracy was achieved with the original training data. Subsequently, as new translation requests are received, new coverage-related metrics may indicate that the original extent of training was insufficient for the request workload encountered in practice, so additional training may be initiated. According to one embodiment, at least a subset of the parameters of the trained NMT may be dynamically modified based on an analysis of the quality metrics 620, as indicated in element 650.

Phrase-Level Highlighting of NMT Translations

Figure 7:
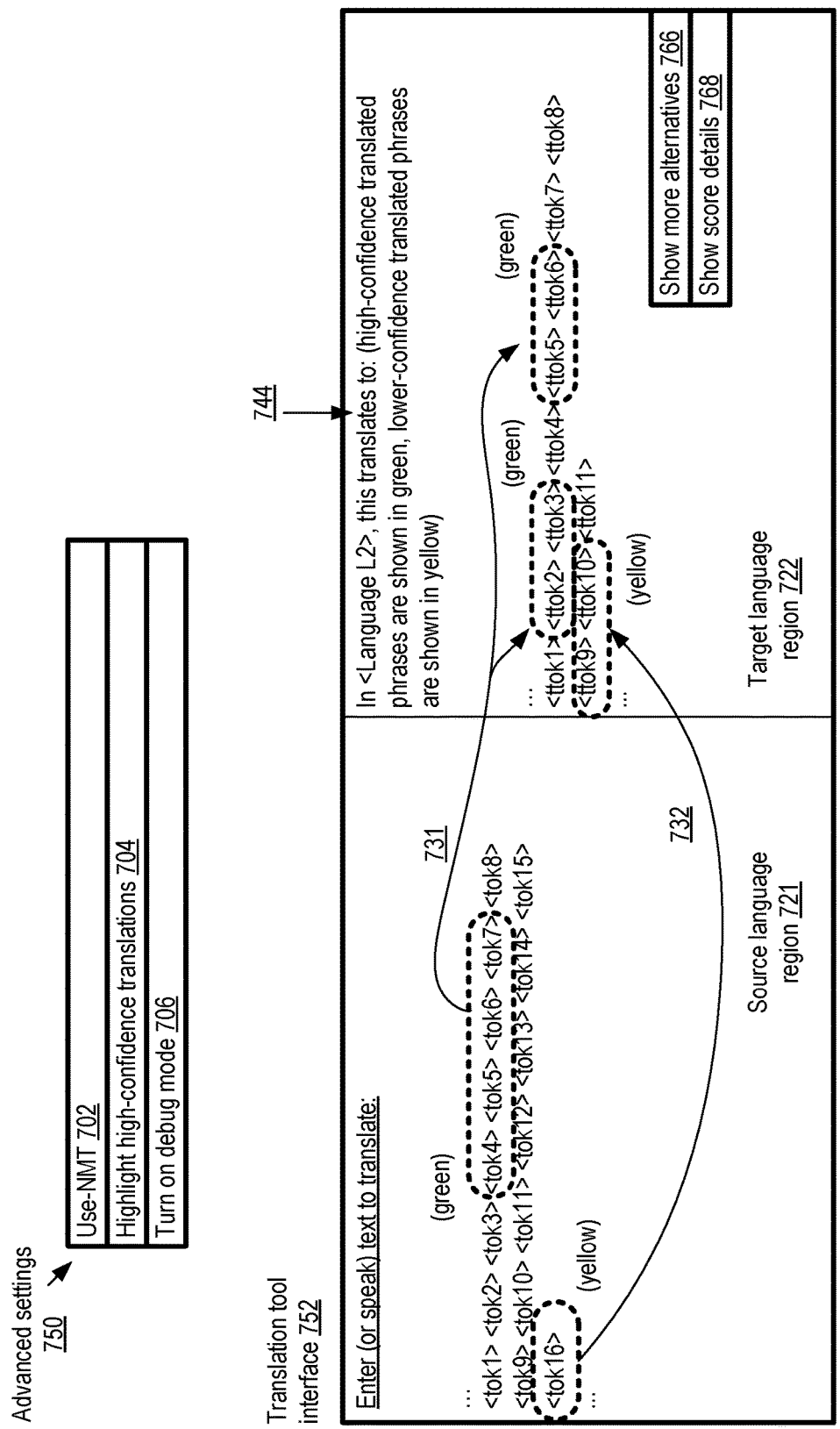
FIG. 7 illustrates example translation confidence-based output highlighting which may be exhibited in response to a translation request, according to at least some embodiments.

FIG. 7 illustrates example translation confidence-based output highlighting which may be exhibited in response to a translation request, according to at least some embodiments. As shown, a translation tool (which may, for example, be implemented as a network-accessible service with web-services based interfaces, or as a standalone tool with a graphical or text-oriented interface) may enable users to select one or more advanced settings 750. A Use-NMT setting 702 may indicate that a neural network based model is to be used for requested translations, for example, while setting 704 may be used to request that phrase-specific translation confidence levels (or confidence levels estimated for other granularities of translation) using statistical phrase tables or other mapping data structures are to be used to highlight token sequences in the source and target languages. A debug mode of translation, in which additional details such as distributions of the translations of individual phrases (which may have been used to obtain the confidence levels) are displayed, may be enabled in some embodiments via setting 706.

As shown, the presentation interface of the translation tool 752 may comprise at least two regions in the depicted embodiment: a source language region 721 and a target language region 722. A sequence of tokens entered (e.g., using a keyboard or microphone) in the source language may be shown in region 721, while the corresponding translated token sequence in the target language may be presented in region 722. In some embodiments, an explanatory message 744 may indicate the meaning of the highlighting provided for candidate token groups of the target language via the interface—for example, token groups that are highlighted in green may represent high-confidence translations, while token groups that are highlighted in yellow may represent lower-confidence translations.

Arrows may be used to point from source language phrases or token groups to the corresponding translated tokens in various embodiments. In the depicted example, the token "<tok16>" in the source language is translated to the token sequence "<ttok9><ttok10>", as indicated by arrow 732, with the confidence level of the translation indicated by the highlighting of "<ttok9><ttok10>". The token sequence "<tok4><tok5><tok6><tok7>" is translated to the combination of "<ttok3><ttok3>" and "<ttok5><ttok6>", as indicated by arrow 731, and a different confidence level for this translation is indicated by a different highlighting. The translation represented by arrow 731 is an example of a non-contiguous target language token collection resulting from a translation of a contiguous input language token collection, which may correspond to the use of broader mapping data structures discussed earlier. In at least some embodiments, instead of using discrete colors to show respective levels of confidence, a more continuous gradation of highlighting (e.g., dark green for the highest confidence level, lighter greens for lower confidence levels, etc.) may be used. In some embodiments, users may request more translation alternatives, e.g., using control 766, and/or more details regarding confidence scores using control 768. Other types of interaction elements may be provided via various types of programmatic interfaces of a translation tool or service in some embodiments.

Example Programmatic Interactions

Figure 8:
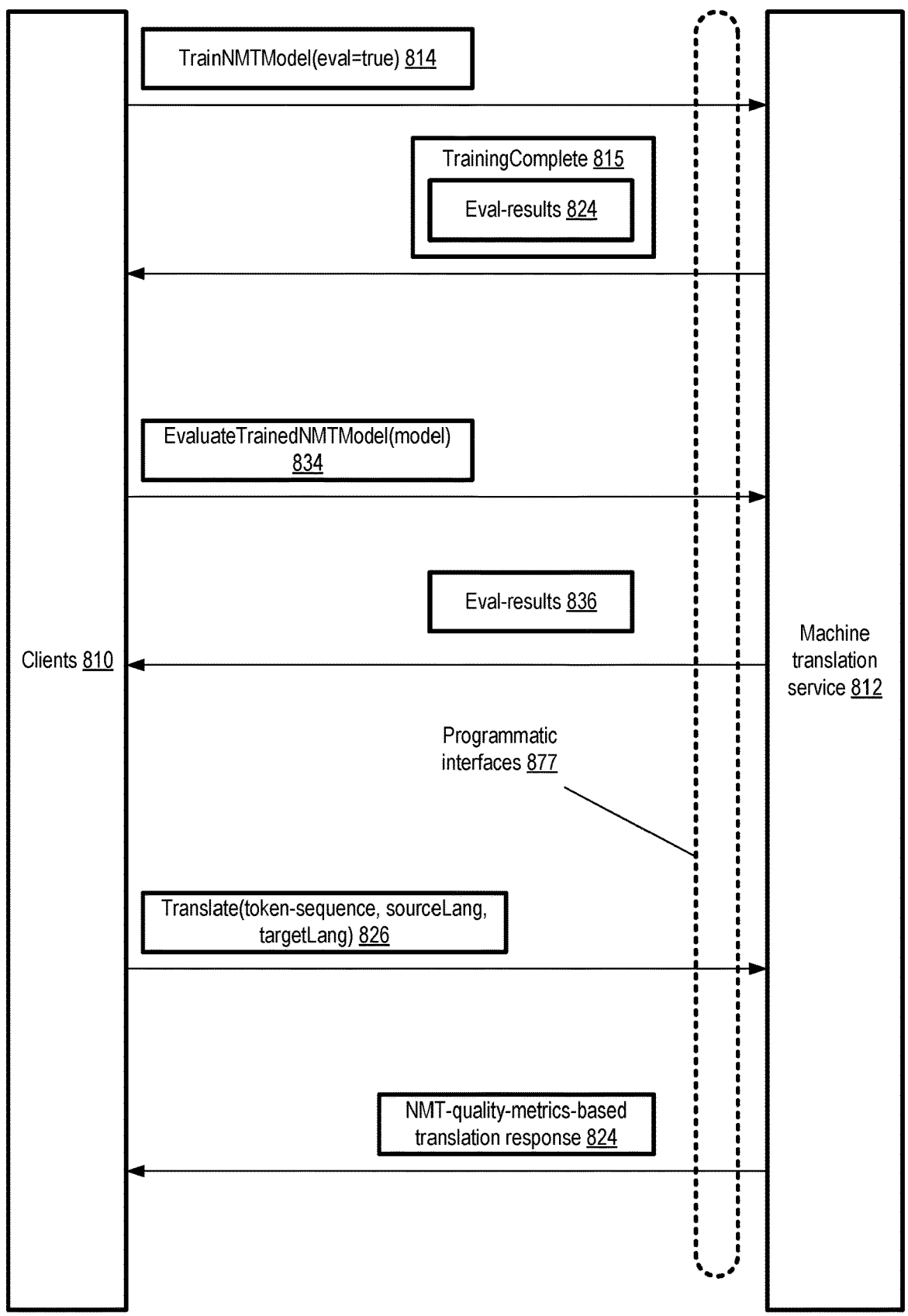
FIG. 8 illustrates examples programmatic interactions of clients with a machine translation service, according to at least some embodiments.

As mentioned earlier, in at least some embodiments, the phrase table based techniques for evaluating a neural network based machine translation technique may be implemented at a network accessible service. FIG. 8 illustrates examples programmatic interactions of clients with a machine translation service, according to at least some embodiments. In the depicted embodiment, a machine translation service 812 may implement one or more programmatic interfaces 877 for client interactions, including for example a web-based console, a set of application programming interfaces (APIs), command-line tools, graphical user interfaces, audio interfaces, and the like.

Using the programmatic interfaces 877, a client 810 of the machine translation service may submit at least three types of requests in the depicted embodiment, and receive corresponding responses. A model training request 814 may be submitted, for example, indicating that a neural network based machine translation (NMT) model is to be trained on behalf of the client. The request 814 may in some implementations comprise a flag or parameter (such as "eval=true") to indicate that the NMT model is to be evaluated using a statistical phrase table (SPT). In other implementations, the SPT-based evaluation may be conducted by default. Other parameters of a training request 814 may, for example, include indications of the training data set (corpora in the source and target languages), evaluation data (e.g., a second source language corpus to be translated to generate an SPT used for evaluation), preferences regarding the specific neural network architectures to be used, resource usage limits for training/evaluating the model, and so on. In some embodiments, a training request 814 for a machine translation model may not necessarily specify that an NMT model is to be generated; the service 812 may select a neural network based MT approach even if the specific methodology to be used is not indicated in the request. In response to a request 814, an NMT model may be trained, and a response 815 indicating that the model has been trained may be provided to the client 810 in the depicted embodiment. In some embodiments, results 824 (e.g., translation quality metrics similar to those discussed above) of evaluating the trained model using an SPT may also be provided via the programmatic interfaces. In one embodiment, respective responses indicating that model training has been initiated and completed (or indicating progress towards training completion), and/or a separate response indicating that evaluation has been completed, may be provided.

In a second type of interaction with the machine translation service 812, in some embodiments a client 810 may submit a request 834 to evaluate an already-trained NMT model via programmatic interfaces 877. For example, one or more files representing the trained model and/or its parameters may be provided as part of the request 834. The machine translation service may use the trained model to translate a selected corpus in a source language into the target language, generate an SPT based on such a translation, and use the SPT to evaluate the NMT. The results of the evaluation 836 may be provided in response.

In a third type of interaction, in various embodiments a client may submit a translation request 826 indicating a token sequence in a source language, and a target language into which the token sequence is to be translated. The machine translation service 812 may utilize one or more models including an NMT model to obtain the requested translation. Quality metrics estimated for the NMT model (or for portions of the translation output from the NMT model) may be used to generate at least a portion of the response 824 in the depicted embodiment—e.g., the quality metrics may be included in the response, and/or a methodology other than the NMT model may be used for a part of the translation based on detecting that the quality achieved using just the NMT model may be improved by also using additional models. As mentioned earlier, implicit or explicit translation requests which are satisfied using trained NMT models may be submitted via a variety of client device types and interface types in different embodiments. For example, a translation request whose response is generated at least partly based on NMT model quality metrics derived from phrase table analysis may be received from, among others, a voice-drive personal assistant device, a wearable computing device, a phone, a tablet computing device, a desktop computing device, a laptop computing device, a camera, an augmented reality device or a virtual reality device in various embodiments. In some embodiments, at least a portion of the response to a translation request may be based on the type of source device from which the request is received. For example, a determination may be made that a translation request received from a camera may not have to be of as high a quality as a translation request received from a desktop, so a particular machine translation model may be used for a camera-submitted request while a different model or ensemble of models may be used if the same source language phrase was submitted from a desktop. In some embodiments, at least some translation requests may be implicit rather than explicit—e.g., if an image of a token sequence is captured via a camera owned by an individual whose home is known to be in a particular country where a language L1 is spoken, and the token sequence is in a different language L2, the translation service may initiate translation of the image's token sequence to L1 even if a request specifically indicating that L1 is the target language is not submitted. Other types of programmatic interactions than those shown in FIG. 8 may be supported by a machine translation service in some embodiments.

Provider Network Environment

Figure 9:
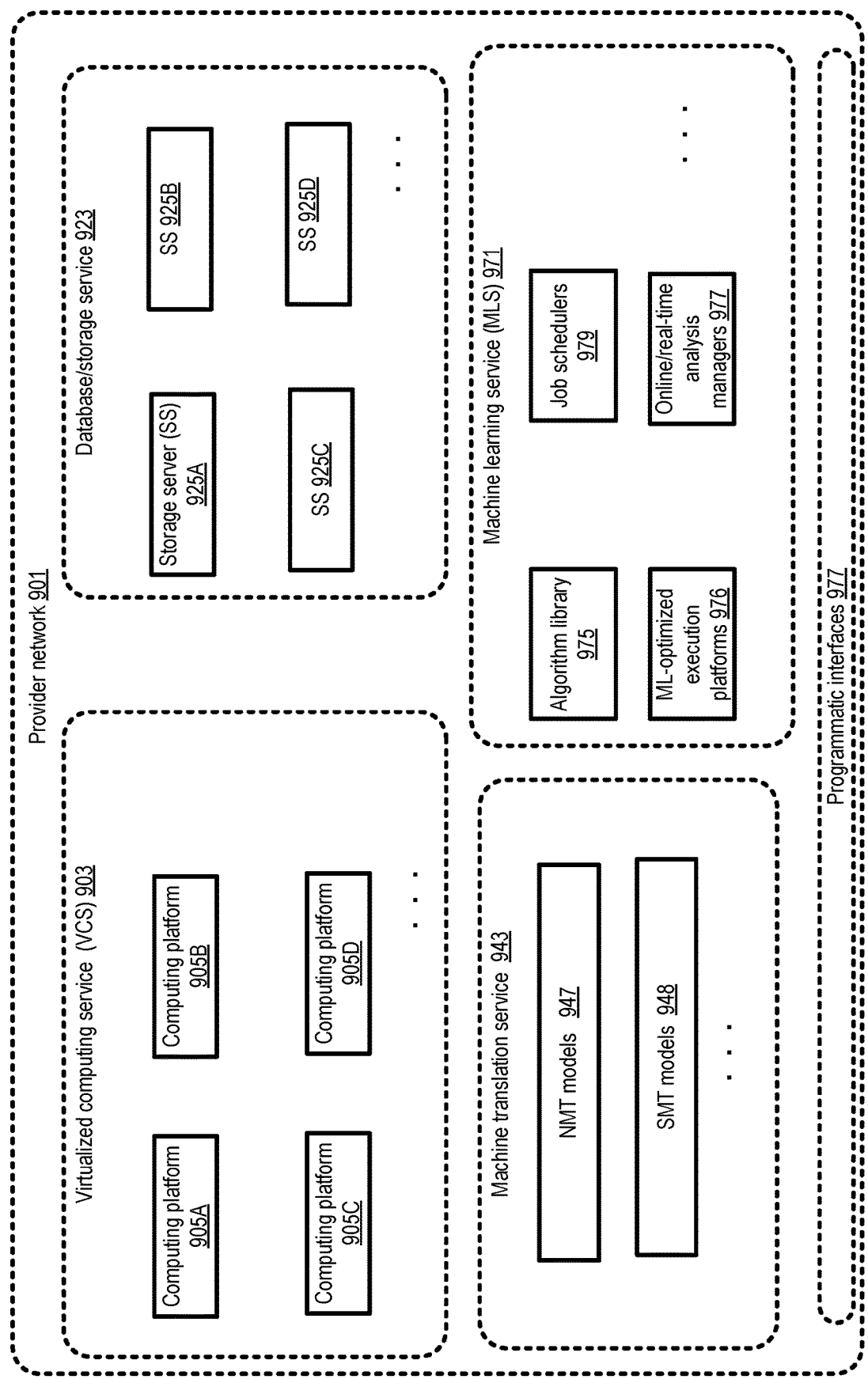
FIG. 9 illustrates a provider network environment at which a machine translation service may be implemented, according to at least some embodiments.

In some embodiments, machine translation may be performed at least in part using resources of a provider network. FIG. 9 illustrates a provider network environment at which a machine translation service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 901 may comprise resources used to implement a plurality of services, including for example a virtual computing service (VCS) 903, a database or storage service 923, a machine learning service (MLS) 971 and a machine translation service 943. In some embodiments, the machine translation service 943 may be implemented as a subcomponent of the MLS 971. Components of a given service may utilize components of other services in the depicted embodiment—e.g., for some machine learning tasks, a component of the machine learning service 971 may utilize virtual machines implemented at computing platforms such as 905A-905D of the virtualized computing service. Input data, intermediate results, final results and/or other artifacts of various machine learning algorithms or models, such as those used for machine translation, may be stored at storage servers 925 (e.g., 925A-925D) of the database or storage service 923 in some embodiments. Individual ones of the services shown in FIG. 9 may implement a respective set of programmatic interfaces 977 which can be used by external and/or internal clients (where the internal clients may comprise components of other services) in the depicted embodiment.

As shown, the machine translation service 943 may comprise, among other components, one or more neural network based machine translation (NMT) models 947. Statistical machine translation (SMT) models 948 may also be implemented in the depicted embodiment. The NMT and/or SMT models may, for example, implement algorithms selected from the machine learning algorithm library 975 in the depicted embodiment, including (in the case of NMT) the LSTM-based sequence-to-sequence models of the kind described earlier. In some embodiments, requests to train some types of machine learning models may be handled as batch jobs at the machine learning service, and a batch job scheduler 979 may orchestrate the allocation of resources for the jobs as well as dependencies among jobs. In the depicted embodiment, online/real-time analysis managers 977 of the MLS 971 may be responsible for executing trained models on behalf of clients of the machine translation service 943—e.g., for real-time translation requests. In at least one embodiment, a machine learning service 971 may have access to or include a set of execution platforms 976 that are optimized for machine learning tasks (e.g., platforms that have customized hardware such as GPU arrays and/or customized software stacks). Depending on the suitability of such platforms for machine translation tasks, one or more execution platforms 976 may be employed for such tasks in the depicted embodiment.

In at least some embodiments, the techniques discussed for evaluation of NMT models using statistical phrase tables may be accomplished using non-specialized computing platforms of the virtualized computing service 903. In various embodiments, at least some of the training and test/evaluation data used for various models may be stored at a database/storage service 923. The techniques for evaluating NMT models described above may be implemented without acquiring resources of network-accessible services such as those shown in FIG. 9 in at least some embodiments. For example, a standalone tool implemented at one or more computing devices which are not part of a network-accessible service may be used in some embodiments.

Methods for Evaluating and Enhancing NMT Models

Figure 10:
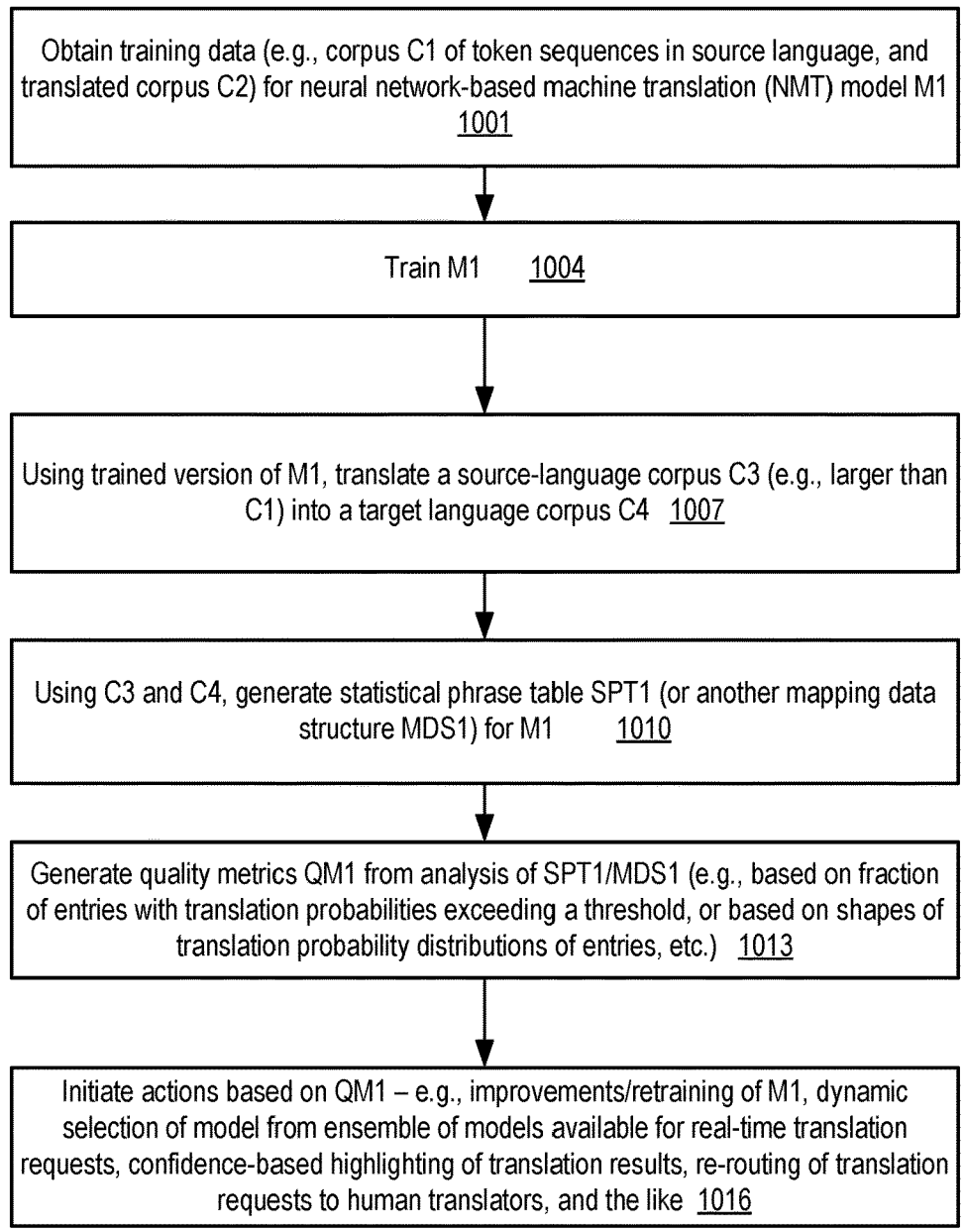
FIG. 10 is a flow diagram illustrating aspects of operations that may be performed for evaluating and improving neural network based machine translation models, according to at least some embodiments.

FIG. 10 is a flow diagram illustrating aspects of operations that may be performed for evaluating and improving neural network based machine translation models, according to at least some embodiments. Training data for a neural network based machine learning model M1 to be used for translation may be obtained, as indicated in element 1001. The training data may, for example, comprise a corpus C1 of token sequences in a source language, and a corresponding translated corpus C2 in a target language. The translations may, for example, have been generated by experienced human translators in some embodiments, or may comprise a well-known translation data set that has been used by research organizations, academics and the like.

The model M1, which may use any of a variety of neural network architectures such as an LSTM-based sequence-to-sequence architecture, may be trained with the help of the training data set to translate token sequences in the source language to token sequences of the target language. Internally, in some embodiments, the NMT model may encode a high-dimensional representation of a token or token group in the source language, and then decode the high-dimensional representation into tokens of the target language.

After the model M1 has been trained, another source language corpus C3 may be translated into a target language corpus C4 (element 1007) in the depicted example. C3 may in some cases be substantially larger than C1, since obtaining translations from the trained model may be less computational resource intensive training the model, and a large data set may be more useful for evaluation purposes.

Using the combination of C3 and C4, a statistical phrase table SPT1 (or a similar mapping data structure MDS1) may be generated with respect to M1 in various embodiments (element 1010). Sub-phases of the SPT/MDS generation procedure in some embodiments may, for example, include word alignment, phrase/grammar extraction and scoring, as discussed earlier in the context of FIG. 3. The SPT/MDS may comprise numerous entries, each indicating, for example, respective forward probabilities of a <source, target> phrase pair (and in some cases, other features of the pair) in various embodiments.

One or more quality metrics pertaining to M1 may then be generated using the statistical phrase table SPT1 or the mapping data structure MDS1 (element 1013). Any of a number of high-level or token-sequence-specific metrics may be generated in different embodiments. For example, the fraction of entries in the statistical phrase table for which the forward translation probability score exceeds a threshold may be computed and used as one of the quality indicators in some embodiments. A higher average confidence score may, at least in some embodiments, indicate a higher overall quality of translations. In at least one embodiment, the statistical distributions of scores associated with various table entries may be examined, and a quality metric corresponding to the distribution may be generated. For example, in one embodiment a preferred distribution may represent a high probability that a given source phrase is translated to a given target phrase, with relatively low probabilities associated with other alternative translations; in such an embodiment, the fraction of source phrases with such preferred distributions may be used as a quality metric.

Based at least partly on the quality metrics QM1, any of a number of responsive actions may be triggered and undertaken in various embodiments (element 1016). Such actions may involve, for example, retraining M1 to enhance translation further, dynamic modification of M1 parameters such as internal weights or thresholds, selection of other models of an ensemble in real time for at least some parts of a translation request, confidence-based highlighting of portions of translation results, re-routing of some translation requests to human translators, and so on.

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations.

Use Cases

The techniques described above, of evaluating neural network based models using extracted statistical phrase tables may be useful in a variety of scenarios. Automated translation of token sequences of one language into another is becoming more of a necessity for various applications, as more and more business and government operations span multiple linguistic regions. Applications that may benefit from high-quality translations may include, for example, travel planning applications, medical applications, customer support applications, dialog-driven assistant applications, and the like. In order for such applications to succeed, the quality of the translations provided may be key. Neural network based machine translations have recently been shown to be superior in many cases to more traditional approaches such as statistical machine translation. However, neural network based techniques may be fairly opaque, in that it may be hard to justify some of the translations provided, or to explain why some phrases or sentences were translated the way they were. By generating statistical phrase tables using output produced by trained NMT models, and then analyzing the phrase tables, more insights may be provided regarding how well the NMT technique works for various sub-domains or individual translation tasks, and the overall quality of machine translations may thereby be improved.

Illustrative Computer System

Figure 11:
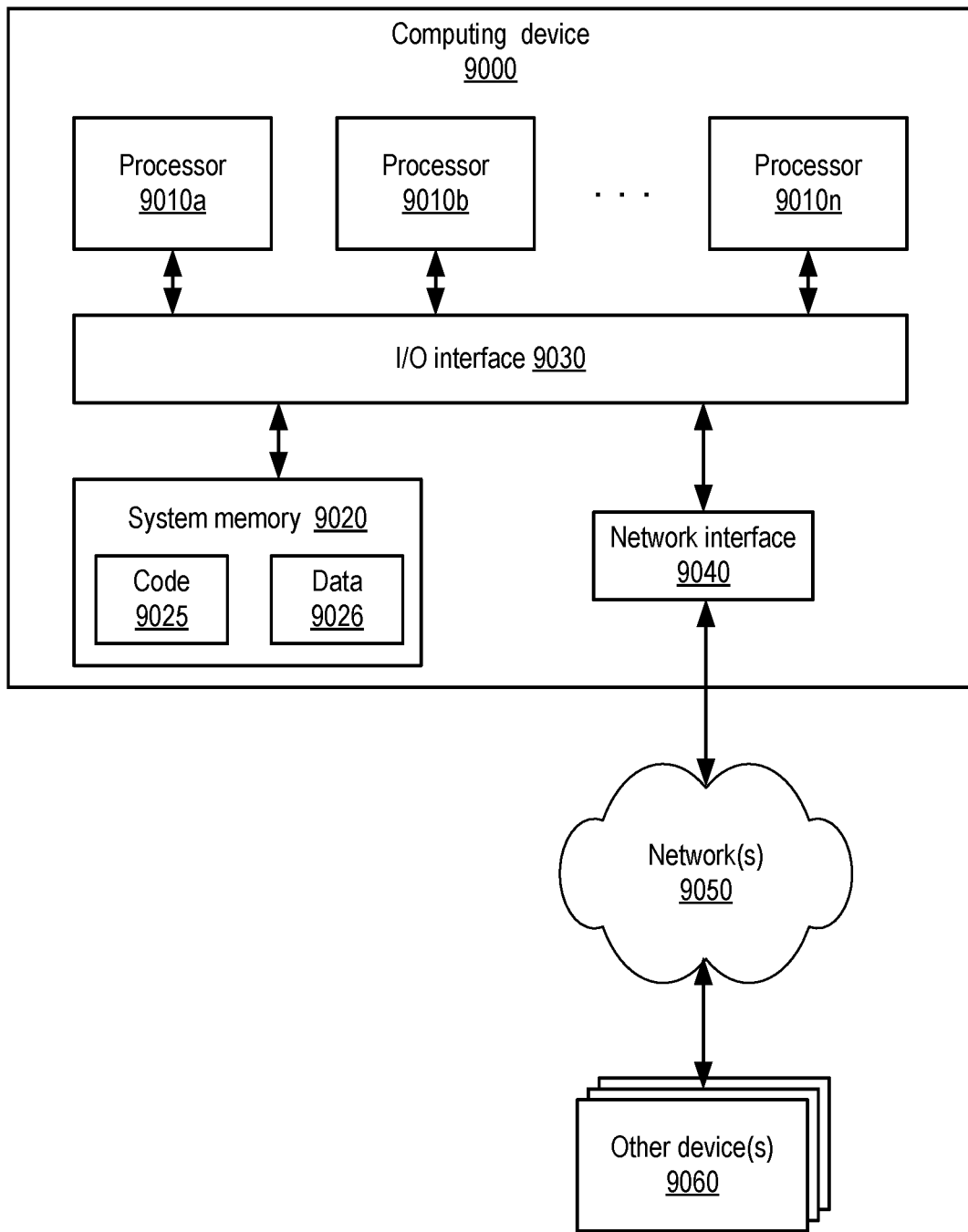
FIG. 11 is a block diagram illustrating an example computing device that may be used in at least some embodiments.

In at least some embodiments, a server that implements a portion or all of one or more of the technologies described herein, including the various components of a machine translation service or tool which may be used to evaluate neural network based machine translators and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   obtaining a translation request at a machine translation service;
   selecting, at the machine translation service for the translation request, a particular machine translation model from a plurality of machine translation models based, at least in part, on (a) a type of device at which the translation request originated and (b) a quality metric of the particular machine translation model; and
   transmitting, by the machine translation service, a response to the translation request, wherein the response is generated using at least the particular machine translation model.

2. The computer-implemented method as recited in claim 1, wherein the device at which the translation request originated comprises one or more of: (a) a camera, (b) a voice-driven personal assistant device, (c) an augmented reality device, (d) a virtual reality device, (e) a desktop computing device, (f) a laptop or (g) a wearable computing device.

3. The computer-implemented method as recited in claim 1, further comprising:
   evaluating, by the machine translation service, the particular machine translation model in response to an evaluation request received via a programmatic interface of the machine translation service.

4. The computer-implemented method as recited in claim 1, wherein the particular machine translation model comprises a neural network.

5. The computer-implemented method as recited in claim 1, wherein the translation request comprises a set of tokens to be translated, the computer-implemented method further comprising:
   causing to be presented, by the machine translation service, an indication of a confidence level associated with a translation of a token of the set of tokens, wherein the translation of the token is included in the response to the translation request.

6. The computer-implemented method as recited in claim 5, wherein the confidence level is obtained using a statistical mapping data structure derived at least in part from analysis of a translation of another set of tokens by the particular machine translation model.

7. The computer-implemented method as recited in claim 5, further comprising:
   obtaining, via one or more programmatic interfaces by the machine translation service after the indication of the confidence level has been presented, a request to provide an alternate translation of at least a particular token of the set of tokens; and
   causing a different translation of the particular token to be presented via the one or more programmatic interfaces.

8. A system, comprising:
   one or more computing devices;
   wherein the one or more computing devices include instructions that upon execution on or across the one or more computing devices cause the one or more computing devices to:
      obtain a translation request at a machine translation service;
      select, at the machine translation service for the translation request, a particular machine translation model from a plurality of machine translation models based, at least in part, on (a) a type of device at which the translation request originated and (b) a quality metric of the particular machine translation model; and
      transmit, by the machine translation service, a response to the translation request, wherein the response is generated using at least the particular machine translation model.

9. The system as recited in claim 8, wherein the device at which the translation request originated comprises one or more of: (a) a camera, (b) a voice-driven personal assistant device, (c) an augmented reality device, (d) a virtual reality device, (e) a desktop computing device, (f) a laptop or (g) a wearable computing device.

10. The system as recited in claim 8, wherein the one or more computing devices include further instructions that upon execution on or across the one or more computing devices:
    evaluate, by the machine translation service, the particular machine translation model in response to an evaluation request received via a programmatic interface of the machine translation service.

11. The system as recited in claim 8, wherein the particular machine translation model comprises a neural network.

12. The system as recited in claim 8, wherein the translation request comprises a set of tokens to be translated, wherein the one or more computing devices include further instructions that upon execution on or across the one or more computing devices:

cause to be presented, by the machine translation service, an indication of a confidence level associated with a translation of a token of the set of tokens, wherein the translation of the token is included in the response to the translation request.

13. The system as recited in claim 12, wherein the confidence level is obtained using a statistical mapping data structure derived at least in part from analysis of a translation of another set of tokens by the particular machine translation model.

14. The system as recited in claim 12, wherein the one or more computing devices include further instructions that upon execution on or across the one or more computing devices:
    obtain, via one or more programmatic interfaces by the machine translation service after the indication of the confidence level has been presented, a request to provide an alternate translation of at least a particular token of the set of tokens; and
    cause a different translation of the particular token to be presented via the one or more programmatic interfaces.

15. One or more non-transitory computer-accessible storage media storing program instructions that when executed on or across one or more processors cause the one or more processors to:
    obtain a translation request at a machine translation service;
    select, at the machine translation service for the translation request, a particular machine translation model from a plurality of machine translation models based, at least in part, on (a) a type of device at which the translation request originated and (b) a quality metric of the particular machine translation model; and
    transmit, by the machine translation service, a response to the translation request, wherein the response is generated using at least the particular machine translation model.

16. The one or more non-transitory computer-accessible storage media as recited in claim 15, wherein the device at which the translation request originated comprises one or more of: (a) a camera, (b) a voice-driven personal assistant device, (c) an augmented reality device, (d) a virtual reality device, (e) a desktop computing device, (f) a laptop or (g) a wearable computing device.

17. The one or more non-transitory computer-accessible storage media as recited in claim 15, storing further program instructions that when executed on or across the one or more processors:
    evaluate, by the machine translation service, the particular machine translation model in response to an evaluation request received via a programmatic interface of the machine translation service.

18. The one or more non-transitory computer-accessible storage media as recited in claim 15, wherein the particular machine translation model comprises a neural network.

19. The one or more non-transitory computer-accessible storage media as recited in claim 15, wherein the translation request comprises a set of tokens to be translated, wherein the one or more non-transitory computer-accessible storage media store further program instructions that when executed on or across the one or more processors:
    cause to be presented, by the machine translation service, an indication of a confidence level associated with a translation of a token of the set of tokens, wherein the translation of the token is included in the response to the translation request.

20. The one or more non-transitory computer-accessible storage media as recited in claim 19, wherein the confidence level is obtained using a statistical mapping data structure derived at least in part from analysis of a translation of another set of tokens by the particular machine translation model.

* * * * *